United States Patent

[11] 3,553,473

| [72] | Inventor | Emett O. Meeks<br>P.O. Box 10493, Midwest City, Okla. 73110 |
|---|---|---|
| [21] | Appl. No. | 775,006 |
| [22] | Filed | Nov. 12, 1968 |
| [45] | Patented | Jan. 5, 1971 |

[54] ALTERNATOR POWER SOURCE
2 Claims, 1 Drawing Fig.

[52] U.S. Cl. .................................................. 290/40, 290/50
[51] Int. Cl. ................................................... H02p 9/04
[50] Field of Search ........................................... 307/10; 290/40, 40.2, 38, 57, 50

[56] References Cited
UNITED STATES PATENTS

| 2,913,589 | 11/1959 | Bell | 307/10 |
|---|---|---|---|
| 2,924,722 | 2/1960 | McClure | 290/40 |
| 3,116,420 | 12/1963 | Fagel | 290/40 |
| 3,127,518 | 3/1964 | Pruitt | 307/10 |
| 3,293,443 | 12/1966 | Burch | 307/10 |
| 3,395,288 | 7/1968 | Von Brimer | 307/10 |
| 3,457,491 | 7/1969 | Black et al. | 307/10X |
| 3,471,706 | 10/1969 | Schneider | 307/10 |

Primary Examiner—G. R. Simmons
Attorney—Robert K. Rhea

ABSTRACT: A direct current power supply is obtained from a battery equipped vehicle engine driven alternator by a circuit and a solenoid actuated vacuum operated battery disconnect switch. The solenoid is energized by a relay in response to closing the starting switch of a power tool connected to the alternator output wiring by the circuit.

PATENTED JAN 5 1971 3,553,473
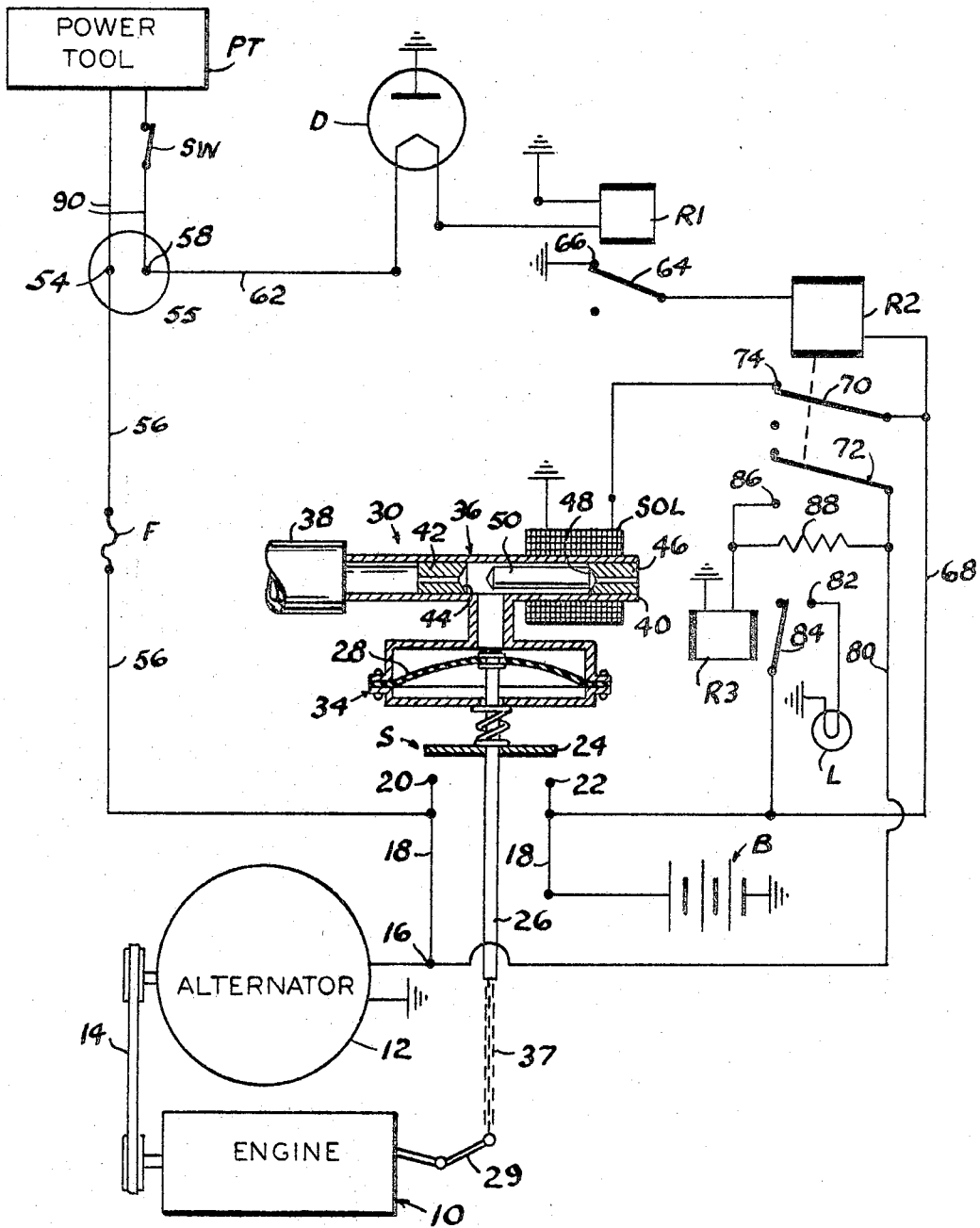
EMETT O. MEEKS
INVENTOR
BY
*Robert K. Rhea*
AGENT

ALTERNATOR POWER SOURCE

BACKGROUND OF THE INVENTION

It is frequently desirable in service or repair work to use electric power driven hand tools where no source of electricity is readily available. Service and repair work is frequently done by personnel having a pickup truck, or the like, but service trucks are not ordinarily provided with electric generators capable of powering electric hand tools. Most vehicle engines are now equipped with an alternator which is capable of supplying the necessary voltage for operating electric hand tools. A conventional vehicle alternator is three-phase wound having a mechanically driven rotor which produces alternating current rectified by diodes to provide a direct current and maintain the vehicle battery substantially fully charged. However, to utilize an alternator for producing sufficient voltage for operating electric hand tools it is necessary that the circuit from the alternator to the battery of the vehicle be interrupted or disconnected to prevent damage to the battery and other components. I accomplish this by interposing a switch in the alternator to the battery circuit which is opened by a vacuum and solenoid operated valve connected with the vehicle accelerator. The solenoid is actuated by a relay energized in response to the closing of the electric hand tool switch when the hand tool is plugged into the relay and battery circuit.

The prior art discloses various devices for providing an auxiliary power takeoff from a vehicle engine. These devices, for example, U.S. Pat. No. 1,772,247; 2,379,940; 2,606,624 and 2,976,424, feature transmission or drive means connected with the vehicle engine for driving an auxiliary generator rather than using existing equipment. The addition of an auxiliary generator to a service truck is an added expense and has not been generally accepted.

This invention, on the other hand, utilizes the existing vehicle alternator with a minimum of additional parts, with the necessary parts being readily available and easily connected with the alternator-battery circuit of a vehicle engine.

SUMMARY OF THE INVENTION

A normally closed switch is interposed in the alternator to the battery circuit. The switch is opened by a diaphragm actuated by a valve, connected with the vehicle vacuum source, having a solenoid for operating the valve. The solenoid is energized by a relay closed by a starting switch in an electrical hand tool connected with the battery circuit. This opens the normally closed switch and disconnects the battery from the alternator while simultaneously accelerating the engine to a predetermined number of revolutions per minute. The solenoid energizing relay is maintained energized by the vehicle battery while the output of the generator, connected to the electrical hand tool and to ground through a diode operates the hand tool until its switch is opened to interrupt the circuit which deenergizes the relay and permits the normally closed switch to close. This invention thereby uses the existing alternator and requires a minimum of modification of the existing vehicle electrical circuit.

The principal object of this invention is to provide an electromechanical kit which utilizes a vehicle alternator as a power source for driving an electrical hand tool, or the like.

BRIEF DESCRIPTION OF THE DRAWINGS

The single figure is a schematic of the components and the circuit.

DESCRIPTION OF THE PREFERRED EMBODIMENT

Like characters of reference designate like parts in those figures of the drawings in which they occur.

In the drawings:

The reference numeral 10 indicates a conventional vehicle engine driving an alternator 12 by a belt and pulley means 14. One terminal of the alternator is grounded and its output terminal 16 is normally connected to a 12 volt battery B by a cable 18 through a voltage regulator, not shown. The ground shown represents the vehicle frame which is conventional in vehicle circuits. The voltage regulator forms no function in connection with the invention. The cable 18 is either cut or two cables of selected length may be used and connected with the terminals 20 and 22 of a two-pole pushbutton type spring closed switch S having a switch arm 24. The switch arm 24 is centrally drilled and connected with a shaft 26 which extends therethrough. The shaft is connected at one end with a diaphragm 28 forming a part of a vacuum unit 30. The other end of the shaft 26 is connected with the engine accelerator linkage 29 by a ball chain 37. The vacuum unit 30 comprises a housing 34 which surrounds and supports the diaphragm 28 and is connected for communication opposite the shaft 26, with the stem of a T-shaped tube 36 having the axis of its other ends vertically disposed. The depending end portion of the T-shaped tube is connected with the engine vacuum source, indicated by the tube 38. The other upwardly disposed end 40 of the tube 36 is open to atmosphere. The vacuum connected end portion of the tube contains a centrally drilled pluglike member 42 having a beveled seat 44 facing upwardly toward the open end 40. The open end 40 is partially closed by a similar pluglike member 46 having a depending beveled seat 48 facing toward the other pluglike member 42 in vertical spaced-apart relation therewith. The bottom seat 44 is normally closed by a gravity actuated plunger 50 having opposing tapered end surfaces cooperatively seating and sealing with the seats 44 and 48. A solenoid SOL surrounds the free end portion 40 of the tube 36 for lifting the plunger 50 and closing the top seat 48 in the manner presently explained.

The switch terminal 20 is connected with one output terminal 54 of a conventional electrical power output socket or receptacle, indicated at 55, by a wire 56 through a suitable fuse F. The other output terminal 58 of the electrical receptacle is connected with one lead of the cathode of a diode D by a wire 62. The anode of the diode D is grounded and its other lead or output terminal is connected to one end of the coil of a leaf relay R1. The other end of the coil of relay R1 is connected to ground. Relay R1 includes an armature 64 and a grounded terminal 66. The armature 64 is connected to one end of the coil of a second relay R2 and the other end of the coil of relay R2 is connected with the switch terminal 22 by a wire 68. Relay R2 includes to armatures 70 and 72. One terminal 74 of relay R2 is connected to one end of the coil of the solenoid SOL. The other end of the coil of the solenoid SOL is connected to ground.

The vehicle is normally provided with a charge indicator lamp L. One terminal of the lamp L is grounded and its other terminal is connected to a terminal 82 of a relay R3. Relay R3 is energized by a wire 80 connected with the output of the alternator 12. The armature 84 of relay R3 is connected with the battery B. Thus, when relay R3 is deenergized, its armature 84 normally contacts its terminal 82 to excite the lamp L and indicate that there is no current in the wire 80. Current in the wire 80 energizes relay R3 to disconnect its armature 84 from its terminal 82 to maintain the lamp L deenergized. Obviously increased voltage over the wire 80, which normally carries a load of approximately 4.2 volts, would damage the relay R3, therefore, wire 80 is divided and connected, respectively, to the second armature 72 and the terminal 86 of relay R2. A relatively high ohm resistor 88 is connected across the wire 80 in parallel with the armature 72. Thus, relay R2, when energized as hereinafter explained, opens the line 80 so that the increased potential, carried by the wire 80, is reduced by the resistor 88 before reaching the relay R3.

A power tool PT, such as a hand drill or saw, is connected by its wiring 90 to the plug-in socket or receptacle 55 of the circuit in a conventional manner. One of the wires 90 is provided with a conventional starting switch SW.

OPERATION

In operation the vehicle engine is normally running at idling speed with the switch S closed and bridging the contacts 20 and 22. The power tool is plugged into the open socket 55 and, when the power tool starting switch SW is closed, current from the battery B, through the switch S and power tool switch SW and through the diode D energizes the leaf relay R1, by the 0.6 volt current output of the diode, closing the armature 64 of relay R1 with its grounded terminal 66 thus energizing the coil of relay R2 from the battery B by wire 68. Energizing relay R2 closes its armature 70 with its solenoid connected terminal 74 for energizing the solenoid SOL. The solenoid SOL lifts the plunger 50 off its gravity closed seat 44 to close with the upper seat 48 so that vacuum from the source 38 pulls the diaphragm 28 and moves the shaft 26 longitudinally to advance the accelerator linkage 29 and increase engine speed to a predetermined setting while simultaneously opening the switch S and disconnecting the battery B from the alternator circuit. The increased engine speed, for example 1,300 r.p.m., drives the alternator 12 for generating a current output of 115 volts which is sufficient to operate the power tool PT.

Energizing relay R2 moves its armature 72 out of contact with its terminal 86 thus opening the wire 80 so that the increased voltage from the alternator passing to the relay R3 is reduced by the resistor 88 to a value commensurate with the design of relay R3. The circuit remains in this condition as long as the power tool switch SW remains closed. Opening the power tool switch SW interrupts the current from the alternator 12, deenergizing relays R1 and R2 and interrupting the current to the solenoid SOL which releases the plunger 50 so that it falls by gravity and closes with its seat 44. Atmospheric air entering the orifice 46 releases the diaphragm 28 so that the spring urged switch S again closes and releases the engine accelerator linkage 29 so that the engine returns to normal idling speed. This completes one cycle of operation of the apparatus.

Obviously the invention is susceptible to changes or alterations without defeating its practicability, therefore, I do not wish to be confined to the preferred embodiment shown in the drawing and described herein.

I claim:

1. An alternator power source in combination with an accelerator equipped engine driving an alternator and having the alternator power output connected with a battery by wiring, the improvement comprising:
    a normally closed switch interposed in the alternator output to battery wiring;
    said normally closed switch having a pair of terminals;
    said normally closed switch being connected with said accelerator for opening said normally closed switch by movement of said accelerator in an engine accelerating direction;
    a solenoid operatively connected with said accelerator for moving said accelerator in an engine accelerating direction;
    normally open circuit means connected in series with said normally closed switch terminals;
    said circuit means including at least one relay and a pair of power output terminals;
    other wiring connecting said relay with said solenoid for energizing said solenoid when said relay is energized; and
    means bridging said power output terminals for energizing said relay and said solenoid.

2. The combination recited in claim 1 wherein the last mentioned means includes an electrical power operated tool having a closeable electrical circuit connected in series with said power output terminals.